US008061189B2

(12) United States Patent
Bachmaier et al.

(10) Patent No.: US 8,061,189 B2
(45) Date of Patent: Nov. 22, 2011

(54) METHOD AND DEVICE FOR MONITORING A COMBUSTION PROCESS IN AN INTERNAL COMBUSTION ENGINE

(75) Inventors: Georg Bachmaier, München (DE); Robert Baumgartner, Gilching (DE); Sven Eisen, Bad Abbach (DE); Daniel Evers, Otterfing (DE); Reinhard Freitag, München (DE); Thomas Hammer, Hemhofen (DE); Oliver Hennig, München (DE); Klaus Pistor, Neubiberg (DE)

(73) Assignee: Continental Automotive GmbH, Hannover (DE)

( * ) Notice: Subject to any disclaimer, the term of this patent is extended or adjusted under 35 U.S.C. 154(b) by 160 days.

(21) Appl. No.: 12/304,169

(22) PCT Filed: May 29, 2007

(86) PCT No.: PCT/EP2007/055208

§ 371 (c)(1),
(2), (4) Date: Sep. 16, 2009

(87) PCT Pub. No.: WO2007/144258

PCT Pub. Date: Dec. 21, 2007

(65) Prior Publication Data

US 2010/0005870 A1 Jan. 14, 2010

(30) Foreign Application Priority Data

Jun. 12, 2006 (DE) ........................ 10 2006 027 204

(51) Int. Cl.
*G01M 15/04* (2006.01)

(52) U.S. Cl. ................................. 73/114.62; 73/114.02

(58) Field of Classification Search .............. 73/114.02, 73/114.62
See application file for complete search history.

(56) References Cited

U.S. PATENT DOCUMENTS

| | | | | |
|---|---|---|---|---|
| 4,398,526 | A | 8/1983 | Hamai et al. | 123/606 |
| 4,825,167 | A * | 4/1989 | Bayba | 324/399 |
| 5,038,744 | A * | 8/1991 | Martin et al. | 123/625 |
| 5,294,888 | A | 3/1994 | Miyata et al. | 324/393 |
| 5,568,801 | A * | 10/1996 | Paterson et al. | 123/598 |
| 5,754,051 | A * | 5/1998 | Miyata et al. | 324/393 |
| 5,777,216 | A * | 7/1998 | Van Duyne et al. | 73/114.67 |
| 5,825,255 | A | 10/1998 | Dijkmans | 331/173 |
| 6,653,840 | B2 * | 11/2003 | Yorita et al. | 324/380 |

(Continued)

FOREIGN PATENT DOCUMENTS

DE 31 29 954 A1 3/1982

(Continued)

OTHER PUBLICATIONS

Waterfall et al., "Visualizing Combustion Using Electrical Impedance Tomography", Chemical Engineering Science, vol. 52., No. 13, pp. 2129-2138, 1997.

(Continued)

*Primary Examiner* — Freddie Kirkland, III
(74) *Attorney, Agent, or Firm* — King & Spalding L.L.P.

(57) ABSTRACT

For monitoring a combustion process in an internal combustion engine wherein a fuel-air mixture is ignited with a high-frequency plasma it is provided to determine the impedance of the plasma. A high-frequency signal is applied to the resonator with a capacity that is so low that no arcing-over forms on the electrodes and the high-frequency current and the high-frequency voltage are measured. The impedance of the ignited mixture is determined from the high-frequency current and the high-frequency voltage.

19 Claims, 3 Drawing Sheets

U.S. PATENT DOCUMENTS

| | | | | |
|---|---|---|---|---|
| 6,913,006 | B2 * | 7/2005 | Schleupen et al. | 123/606 |
| 7,594,423 | B2 * | 9/2009 | Padhi et al. | 73/35.09 |
| 2004/0112350 | A1 * | 6/2004 | Schleupen et al. | 123/606 |
| 2004/0129241 | A1 | 7/2004 | Freen | 123/143 B |
| 2007/0283916 | A1 | 12/2007 | Bachmaier et al. | 123/143 B |
| 2010/0263643 | A1 * | 10/2010 | Agneray et al. | 123/608 |

FOREIGN PATENT DOCUMENTS

| | | | |
|---|---|---|---|
| DE | 31 29 954 | C2 | 3/1987 |
| DE | 697 13 226 | T2 | 2/2003 |
| DE | 10 2004 039 406 | A1 | 2/2006 |
| DE | 10 2005 036 968 | A1 | 2/2007 |
| EP | 0 513 996 | A1 | 10/1992 |

OTHER PUBLICATIONS

Bundeministerium fur Bildung und Forschung, Prozessvielfalt + Nachhaltigkeit, Heller und weiter mit weniger Energie, Umweltkonforme Mobilitität, Forschungsbericht, p. 16, May 2000.

* cited by examiner

METHOD AND DEVICE FOR MONITORING A COMBUSTION PROCESS IN AN INTERNAL COMBUSTION ENGINE

CROSS-REFERENCE TO RELATED APPLICATIONS

This application is a U.S. National Stage Application of International Application No. PCT/EP2007/055208 filed May 29, 2007, which designates the United States of America, and claims priority to German Application No. 10 2006 027 204.8 filed Jun. 12, 2006, the contents of which are hereby incorporated by reference in their entirety.

TECHNICAL FIELD

The invention relates to a method for monitoring a combustion process in an internal combustion engine.

BACKGROUND

"Waterfall R. C. et al.: Visualizing combustion using electrical impedance tomography, Chemical Engineering Science, Vol. 52, No. 13, pp. 2129-2138, 1997" discloses the monitoring of the combustion process in an internal combustion engine, wherein the complex impedance of the plasma obtained in the combustion chamber during the ignition is measured and evaluated. When determining the complex impedance a wide frequency range can also be used in the process. The techniques developed for an electrical capacity tomography were adapted in a scaled model of an engine with internal combustion for characterizing combustion phenomena. The method can locate the flame position, measure the flame size and monitor the effect of a changed air/fuel ratio. Combustion misfires can be identified. The technique can measure the arrival time of the flame front and reliably present the development of the combustion process in a research model of a one-cylinder engine with internal combustion.

DE 697 13 226 T2 discloses a diagnostic method for the ignition of an internal combustion engine by registering the ionizing signal of the gases in the cylinders of the engine having an ignition coil, whose primary winding is connected with an electronic power module for the ignition, and whose secondary winding is connected with at least one plug of a cylinder. The diagnostic method comprises a first leg for the frequency compensation of the coil in order to increase its resonant frequency to a value which is twice the size of the frequency of the ionizing signal to be registered. The diagnostic method additionally comprises a second leg for measuring the ionizing impedance of the gases with activation of the primary control of the coil through a constant amplitude current which is supplied by a vibration pickup controlled by the parallel resonant frequency of the coil and activating the voltage at the terminals of the coil.

DE 10 2004 039 406 A1 discloses a plasma ignition method and device for igniting fuel/air mixtures in internal combustion engines. To ignite fuel/air mixtures in at least one combustion chamber of an Otto cycle engine the following steps are carried out: ignition of an HF gas discharge as main discharge for generating a plasma channel in the region of the boundary between an ignition element and the combustion chamber; preceding or maximally simultaneous ignition of an HF gas discharge as auxiliary discharge for generating a flow directed at the plasma channel, wherein the auxiliary discharge is positioned behind the main discharge from the combustion chamber, so that the directed flow presses the plasma channel of the main discharge into the combustion chamber.

The research report "BNDF: Plasma technology, Research Report May 2000, Page 16" discloses a new type of plasma ignition. The principle of the plasma ignition introduced here however utilizes an ignition mechanism in the nano-second range. This brings with it several advantages: the electrode arrangement can be configured so that no parts protrude into the combustion chamber any longer. A plasma beam securely reaches the layers of ignitable mixtures in the sophisticated combustion zones especially in modern gasoline direct injection engines.

In the case of drives for internal combustion engines the requirements in terms of power and pollutant emission are increasingly raised. In the case of modern drives for gasoline engines, engines are therefore being developed in which a gasoline-air mixture is ignited in the combustion chamber of the individual cylinders with a high-frequency plasma. Such an ignition system for internal combustion engines is known for example from DE 31 29 954 C2.

In order to minimize the number of ignition misfires the plasma combustion duration as well as the plasma capacity is selected so large that the plasma energy is adequate in all cases to safely ignite the gasoline-air mixture. Thus, however, these quantities are identical for all cylinders and often selected too large. However, this is accompanied by a high load of the electrodes at the tip of the resonator. In addition, the system often absorbs unnecessary energy since the additional plasma effect provided for safety reasons does not provide any advantages after a completed ignition.

To monitor the combustion process only signals of additionally provided sensors can be used with the currently employed high-frequency systems, which however would have to be additionally integrated in the vehicle. In addition to this, these sensors do not work cylinder-specifically but transmit results which allow conclusions only for the entire combustion process of the internal combustion engine.

SUMMARY

According to various embodiments, a method and a device for monitoring a combustion process in an internal combustion engine can be proposed wherein a fuel/air mixture is ignited with a high-frequency plasma that can be employed cost-effectively and by means of which a conclusion on the individual cylinder conditions upon igniting of the fuel-air mixture is possible.

According to an embodiment, a method for monitoring a combustion process in an internal combustion engine may comprise the step of igniting a fuel-air mixture with a high-frequency plasma, wherein a high-frequency signal is applied to the resonator with a capacity which is so low that no electric arcing-over forms on the electrodes, wherein the high-frequency current and the high-frequency voltage are measured, wherein the impedance of the ignited mixture is determined from the high-frequency current and the high-frequency voltage and wherein the combustion process is evaluated by means of the impedance.

According to a further embodiment, the impedance of the ignited mixture can be determined on each of the cylinders provided in the internal combustion engine. According to a further embodiment, the combustion process over the course of time may be determined from the impedance. According to a further embodiment, an adaptation for the following ignition process can be determined from the impedance. According to a further embodiment, from the combustion process over the course of time at least one of the plasma duration and the plasma capacity can be adapted to the following ignition process. According to a further embodiment, According to a further embodiment, from the determined impedance a conclusion can be drawn as to whether firing-up has not materialized and in this case, a post-ignition for the same combustion process is initiated. According to a further embodiment, from the determined impedance a conclusion can be drawn as to whether firing-up has not materialized and in this case exhaust gas re-treatment or re-combustion is initiated. According to a further embodiment, the quality of the resonator can be determined and the impedance is established from the quality of the resonator. According to a further embodiment, a high frequency which changes over time can be applied to the resonator and the high-frequency voltage and the high-frequency current are measured at several frequencies and the quality of the resonator can be determined from a phase shift of the high-frequency voltage and the high-frequency current. According to a further embodiment, the impedance can be determined in that a DC voltage is applied to the input of the resonator and with a DC voltage measurement of the ion current the resistance forming between the electrodes is measured.

According to another embodiment, a method for monitoring a combustion process in an internal combustion engine wherein a fuel-air mixture is ignited with a high-frequency plasma, may comprise the steps of: determining the impedance of the ignited mixture and evaluating the combustion process by means of the impedance, wherein from the impedance the course over time of the combustion process is determined, and wherein from the course over time of the combustion process at least one of the plasma duration and the plasma capacity are adapted for the following ignition process.

According to a further embodiment, the impedance of the ignited mixture can be determined on each of the cylinders provided in the internal combustion engine. According to a further embodiment, an adaptation for the following ignition process can be determined from the impedance. According to a further embodiment, from the determined impedance a conclusion can be drawn as to whether firing-up has not materialized and in this case, post-ignition for the same combustion process can be initiated. According to a further embodiment, from the determined impedance a conclusion can be drawn as to whether firing-up has not materialized and in this case exhaust gas re-treatment or re-combustion is initiated. According to a further embodiment, the impedance can be determined in that a high-frequency signal is applied to the resonator with a capacity which is so low that no electric arcing-over forms on the electrodes and the high-frequency current and the high-frequency voltage are measured. According to a further embodiment, the quality of the resonator can be determined and the impedance is established from the quality of the resonator. According to a further embodiment, a high frequency which changes over time can be applied to the resonator and the high-frequency voltage and the high-frequency current are measured at several frequencies and the quality of the resonator can be determined from a phase shift of the high-frequency voltage and the high-frequency current. According to a further embodiment, the impedance can be determined in that a DC voltage is applied to the input of the resonator and with a DC voltage measurement of the ion current the resistance forming between the electrodes is measured.

BRIEF DESCRIPTION OF THE DRAWINGS

Further advantages and advantageous embodiments of the invention are the subject of the following figures and their appurtenant description sections.

It shows in detail.

DETAILED DESCRIPTION

Figure 1:
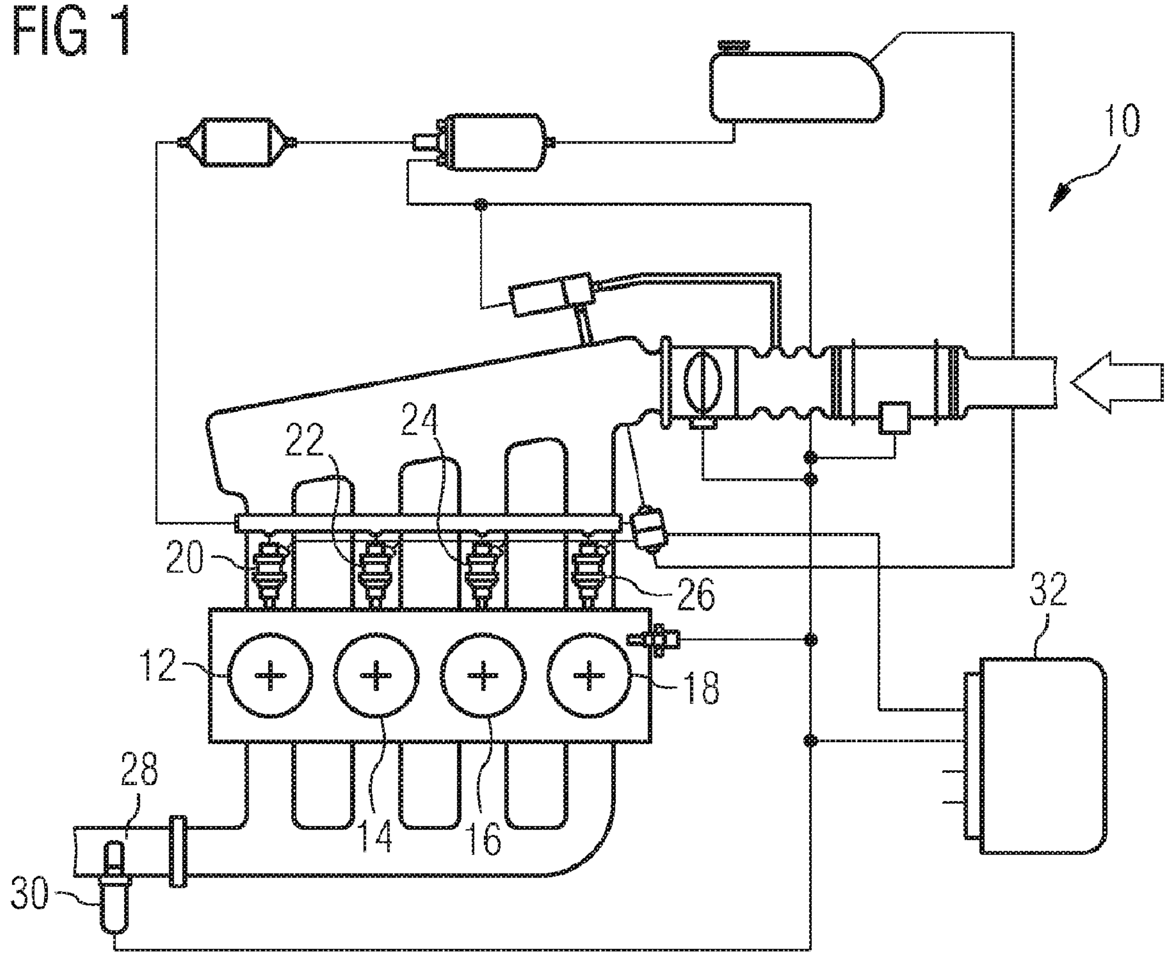
FIG. 1 schematically an internal combustion engine.

According to various embodiments it is proposed to monitor the combustion process during the ignition of a fuel-air mixture in that the impedance of the ignited mixture is determined and by means of the determined impedance conclusions about the combustion process and more preferably the ignition are drawn.

For according to various embodiments it has been shown that a flame front moves through the combustion chamber containing the ionized gas after the mixture has ignited itself. The impedance of the ignited mixture is dependent on the conditions during the combustion process, more preferably on the gas pressure, the gas temperature and the gas composition. Thus, with the knowledge of the impedance, a conclusion as to the conditions prevailing during the combustion process can be drawn so that statements concerning the state of the ionized gas between the utilized electrodes are possible. More preferably following successful firing-up a temperature increase can be registered as can a pressure increase.

The impedance is determined in that a high-frequency signal of a low capacity is applied to the input of the resonator whose strength is selected just so that no electric arcing-over develops on the electrodes and no plasma can be maintained but that measurement of the high-frequency voltage and the high-frequency current is nevertheless possible from which the impedance of the ignited mixture is then calculated.

The frequencies of a high-frequency plasma according to various embodiments are in the range of approximately 30 KHz to 300 GHz. Thus a high-frequency range, comprising long waves, medium waves, short waves, very high frequency (VHF) waves, ultra high frequency (UHF) waves, super high frequency (SHF) waves and extremely high frequency (EHF) waves is utilized according to the various embodiments. More preferably the microwave range of approximately 300 MHz to 3 GHz is utilizable for the various embodiments in a particularly simple manner.

In an embodiment, the measurement of the impedance of the ignited mixture is carried out on each cylinder provided in the internal combustion engine. Thus, individual cylinder monitoring or analysis of the ignition process can be achieved. By registering the impedance for each cylinder it is also possible to determine the course of time of the combustion process, assuming suitably frequent data acquisition.

This data can be transmitted to a control device, for example the engine control which is available anyhow, where the data can be evaluated and, if applicable, used as basis for a reaction of the control device. From the course of time of the combustion process the plasma duration and the plasma capacity can more preferably be adapted for the following ignition process.

In a further embodiment the conclusion as to whether firing-up has occurred successfully is drawn from the impedance determined. If it is determined that firing-up has failed to materialize, a post-ignition is initiated. Thus misfires can be cylinder-individually avoided through focused post-ignition. Furthermore it is possible following the establishment of a mis-fire to initiate focused exhaust gas re-processing, more preferably re-combustion. By this it is thus possible to cylinder-specifically monitor the ignition process in situ and suitably intervene if required.

The impedance can for example be determined in that a high-frequency signal of a low capacity is applied to the input of the resonator whose strength is selected just so that no electric arcing-over develops on the electrodes and no plasma can be maintained but that measurement of the high-frequency voltage and the high-frequency current is nevertheless possible from which the impedance of the ignited mixture is then calculated.

A further possibility of determining the impedance consists in determining the quality of the resonator and subsequently draw a conclusion as to the impedance from the quality of the resonator. For if an insulating gas is present between the electrodes at the tip of the resonator its quality is only determined through losses which occur within the resonator. If a high frequency which changes over time is applied to the resonator and the high-frequency voltage and the high-frequency current is measured at several frequencies, the quality of the resonator can be determined from a phase shift of the high-frequency voltage and the high-frequency current. The impedance is then obtained from the quality.

A further possibility of determining the impedance consists in applying a DC voltage to the input of the resonator. With a direct current measurement of the ion current it is possible to measure the resistance that is established between the electrodes, from which the impedance is then obtained.

With the method and the device according to various embodiments the temperature and pressure increase following successful firing-up can be registered. Misfires can be easily detected and required measures, such as post-ignition or exhaust gas reprocessing can be initiated. Thus it is possible to cylinder-individually analyze the combustion process in situ and also intervene in the ignition process if required.

FIG. 1 schematically shows an internal combustion engine 10 with individual cylinders 12, 14, 16, 18 and appurtenant injection valves 20, 22, 24, 26. In an exhaust duct 28 an exhaust probe (lambda probe) 30 is provided whose electrical output signal depends on the oxygen component of the exhaust gases so that via this conclusions as to the injected fuel-air mixture can be drawn. For control an engine control 32 is provided. The engine control 32 also receives the signals of other signal generators provided in the engine, such as for instance the lambda probe 30. The operation and the construction of the engine control 32 are already known per se. Among other things it serves for the proportioning of the fuel-air mixture to the cylinders 12-18 and for controlling the ignition timing.

Figure 2:
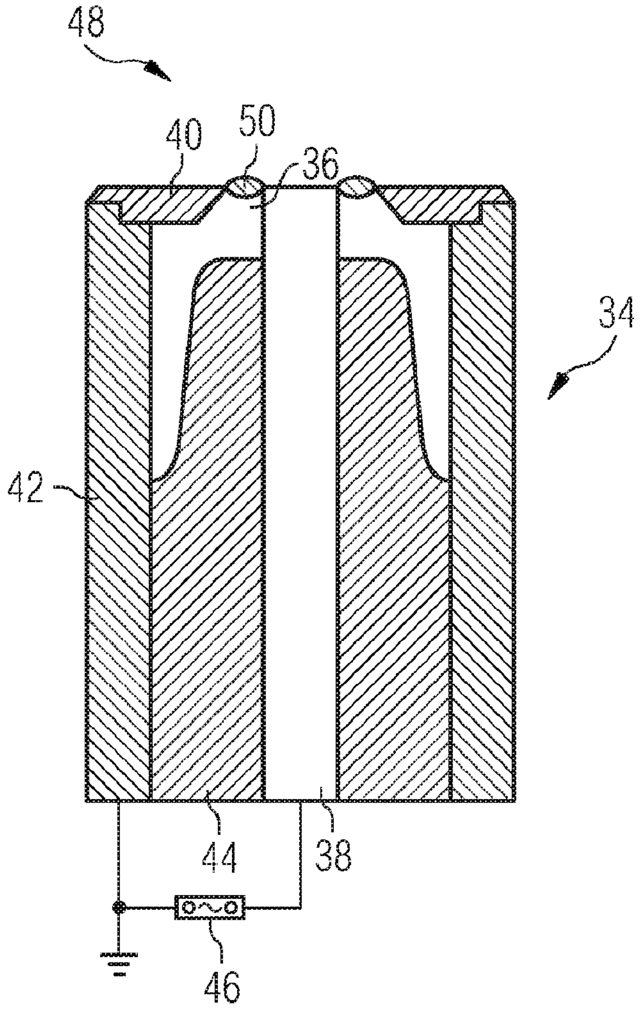
FIG. 2 an example of a high-frequency ignition device.

FIG. 2 shows a high-frequency ignition device 34 with a resonator 36, a voltage electrode 38 and a counter-voltage electrode 40. The counter electrode is connected with ground 42 and isolated from the voltage electrode 38 via an insulation 44. The high-frequency voltage (HF voltage) is provided by an HF generator 46. During the HF plasma ignition the fuel-air mixture is ignited in the combustion chamber 48 with a high-frequency plasma 50, which forms between the voltage electrode 38 and the counter electrode 40 and reaches some millimeters into the combustion chamber 48. After the mixture has ignited, a flame front moves through the combustion chamber 48 which contains ionized gas. This ionized gas possesses a certain impedance which among other things depends on the gas pressure, the gas temperature and the gas composition.

In principle the impedance Z as complex alternating current resistance $$Z = \frac{u(t)}{i(t)}$$

can be calculated upon knowledge of the time-dependent alternating voltage u(t) and the time-dependent alternating current i(t). It is thus possible with the determined impedance to make statements concerning the state of the ionized gas between the used electrodes. A temperature change as well as a pressure change can be determined. From this data a conclusion can be drawn as to whether firing-up occurred or did not occur. If a misfire is detected on a cylinder, suitable measures can be initiated by the engine control 32 in order to cylinder-individually compensate that cylinder. For example a correction can be carried out through a slightly retarded second ignition process which contributes to a minimization of the ignition energy. It is likewise possible to initiate suitable exhaust gas re-treatment, such as re-combustion.

By determining the impedance between the voltage electrode 38 and the counter electrode 40 after the deactivation of the HF plasma, i.e. after the high-frequency voltage has been switched off, the combustion process can thus be individually controlled in each cylinder, while the combustion process over the course of time can also be analyzed and the plasma duration and plasma capacity adapted to the next ignition process. In this way the load on the electrodes 38, 40 is also reduced since the plasma duration and the plasma energy can be reduced to the actual amount required.

Each high-frequency ignition device 34 is connected with the engine control 32 for transmitting the impedance data or the data with which a conclusion as to the impedance can be drawn. The engine control 32 for instance contains data from the individual cylinders 12, 14, 16, 18 without it being required to provide additional sensors.

Figure 3:
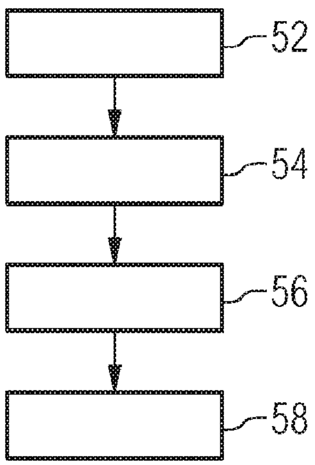
FIG. 3 schematically the sequence of the method according to an embodiment.

FIG. 3 shows schematically the sequence of the method according to an embodiment. Here the method starts in step 52 with the plasma ignition during which the fuel-air mixture is ignited in the combustion chamber 48. Following completed ignition the HF plasma is switched off in step 54. After this, the impedance between the voltage electrode 38 and the counter electrode 40 can be established which is determined by the characteristics of the ionized gas present there. As soon as the values of the impedance are available in the engine control 32 a conclusion as to the state of the ignited mixture 58 and thus the combustion process can be drawn for each individual cylinder.

Figure 4:
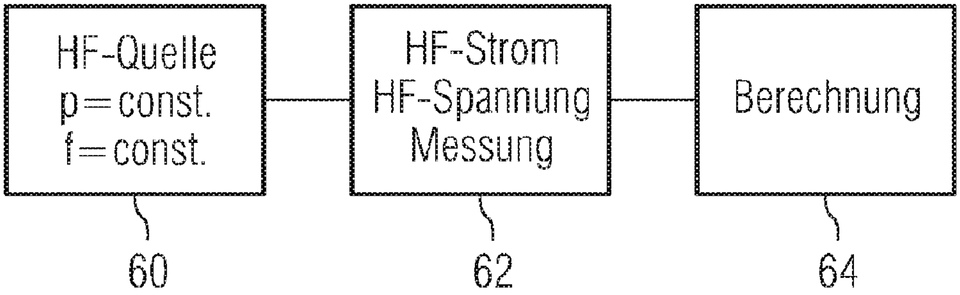
FIG. 4 schematically a first method for determining the impedance.
Figure 5:
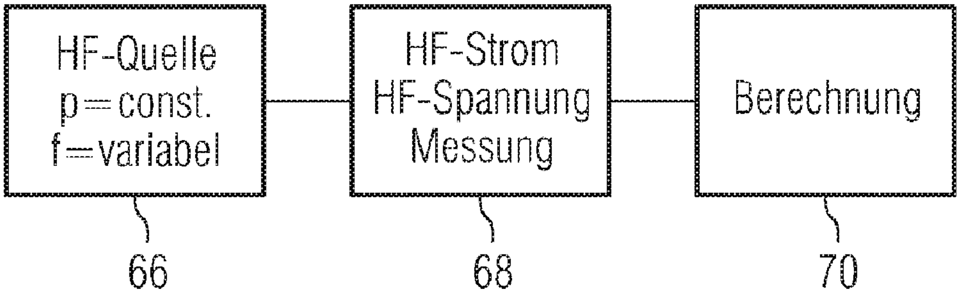
FIG. 5 schematically a second method for determining the impedance.
Figure 6:
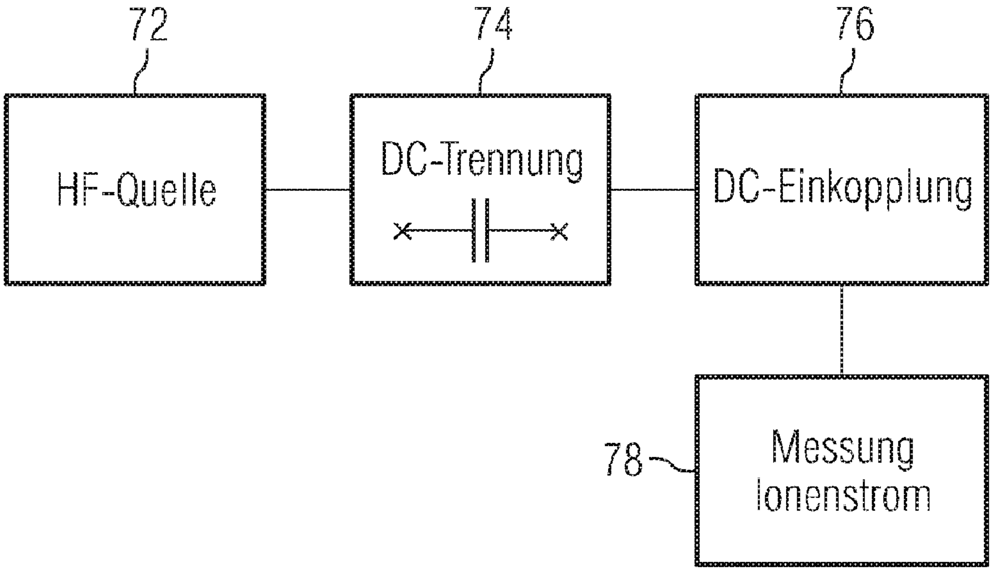
FIG. 6 schematically a third method for determining the impedance.

Different possibilities of determining the impedance are schematically shown in FIGS. 4 to 6. FIG. 4 shows a first possibility where in the starting point 60 it is assumed that a constant frequency $f_0$ and a constant power $P_0$ is applied to the HF generator 46. The constant power $P_0$ has been selected that low that no electric arcing-over takes place between the electrodes 38 and 40 and that no plasma can be maintained either. However the power $P_0$ is selected so that in step 62 a measurement of the HF current i(t) and the HF voltage u(t) can just be performed so that from these values in step 64 the impedance can then be calculated via $$Z = \frac{u(t)}{i(t)}$$

which is present i(t) between the voltage electrode 38 and the counter electrode 40.

FIG. 5 shows schematically a second possibility of determining the impedance, while the determination is based on determining the quality of the resonator. If an insulating gas is present between the electrodes 38 and 40 at the tip of the resonator its quality is only determined by the losses within the resonator. An additional impedance between the voltage electrode 38 and the counter electrode 40 increases the losses in the resonator so that its overall quality diminishes with load. To determine the quality in starting point 66 an HF signal is applied via the HF generator 46 whose frequency $f_{var}(t)$ changes over time. Here the frequency is selected so that the center frequency $f_{center}$ is the resonant frequency of the resonator 36. The power $P_0$ however is kept constant. In step 68 the HF voltage and the HF current are then determined at several frequencies. After this, in step 70, the quality of the resonator is determined from the phase shift of the HF voltage and the HF current, from which the wanted impedance can then be calculated.

A further possibility for determining the impedance is schematically shown in FIG. 6, wherein the impedance is determined in that a DC voltage is applied to the input of the resonator 36. Here, the measuring principle is based on that the internal conductor of the resonator 36 is connected with the voltage electrode 38 in terms of DC voltage. Thus the ion current which flows between the voltage electrode 38 and the counter electrode 40 can be measured with a direction current measurement. From this the plasma resistance between the electrodes 38 and 40 and thus the wanted impedance can then be determined. In the starting point 72 a high frequency is applied to generate and maintain a plasma. A charge capacitor is provided which is charged in step 74 while the high-frequency plasma is being maintained. After the high-frequency plasma has been switched off the charge capacitor then serves as voltage source for measuring the ion current between the voltage electrode 38 and the counter electrode 40, wherein in step 76 the charge capacitor is coupled in. The actual ion current measurement then takes place in step 78. With the values gained from the ion current measurement the resistance of the plasma that forms and thus the impedance can then be determined. This procedure has the advantage that interference voltages that can be coupled in via a voltage source are kept away from the ion current measuring circuit and can thus not distort the measuring result.

The methods described show that according to various embodiments it is thus possible to cylinder-individually determine the impedance without additional sensors and to draw conclusions as to the conditions during the ignition of the fuel-air mixture from the data of the impedance gained. Thus cylinder-individual analysis and verification of the ignition process is possible. Integrating this gained data in the engine control constitutes a considerable contribution to improve the control of the internal combustion engine. More preferably it is possible to reduce the load on the electrodes and thus increase their lifespan through an improvement of the setting of the values for the plasma combustion duration and the plasma energy.

What is claimed is:

1. A method for monitoring a combustion process in an internal combustion engine comprising the step of igniting a fuel-air mixture with a high-frequency plasma, wherein a high-frequency signal is applied to a resonator with a capacity which is so low that no electric arcing-over forms on the electrodes, wherein at least one high-frequency current and at least one high-frequency voltage are measured, wherein a quality of the resonator is determined based at least on the at least one high-frequency current and the at least one high-frequency voltage, and wherein an impedance of the ignited mixture is determined based at least on the determined quality of the resonator, and wherein the combustion process is evaluated by means of the impedance.

2. The method according to claim 1, wherein the impedance of the ignited mixture is determined on each of the cylinders provided in the internal combustion engine.

3. The method according to claim 1, wherein the combustion process over the course of time is determined from the impedance.

4. The method according to claim 1, wherein an adaptation for an ignition process following the combustion process is determined from the impedance.

5. The method according to claim 3, wherein from the combustion process over a course of time at least one of a plasma duration and a plasma capacity is adapted to an ignition process following the combustion process.

6. The method according to claim 1, wherein from the determined impedance a conclusion is drawn as to whether firing-up has not materialized and in this case, a post-ignition for the same combustion process is initiated.

7. The method according to claim 1, wherein from the determined impedance a conclusion is drawn as to whether firing-up has not materialized and in this case exhaust gas re-treatment or re-combustion is initiated.

8. The method according to claim 1, wherein a high frequency which changes over time is applied to the resonator and the high-frequency voltage and the high-frequency current are measured at several frequencies and the quality of the resonator is determined from a phase shift of the high-frequency voltage and the high-frequency current.

9. The method according to claim 1, wherein the impedance is determined in that a DC voltage is applied to the input of the resonator and with a DC voltage measurement of an ion current a resistance forming between the electrodes is measured.

10. A method for monitoring a combustion process in an internal combustion engine wherein a fuel-air mixture is ignited with a high-frequency plasma, the method comprising the steps of:

determining a quality of a resonator, determining an impedance of the ignited mixture based at least on the determined quality of the resonator, and evaluating the combustion process by means of the impedance, wherein from the impedance a course over time of the combustion process is determined, and wherein from the course over time of the combustion process at least one of a plasma duration and a plasma capacity are adapted for an ignition process following the combustion process.

11. The method according to claim 10, wherein the impedance of the ignited mixture is determined on each of the cylinders provided in the internal combustion engine.

12. The method according to claim 10, wherein an adaptation for an ignition process following the combustion process is determined from the impedance.

13. The method according to claim 10, wherein from the determined impedance a conclusion can be drawn as to whether firing-up has not materialized and in this case, post-ignition for the same combustion process is initiated.

14. The method according to claim 10, wherein from the determined impedance a conclusion is drawn as to whether firing-up has not materialized and in this case exhaust gas re-treatment or re-combustion is initiated.

15. The method according to claim 10, wherein the impedance is determined in that a high-frequency signal is applied to the resonator with a capacity which is so low that no electric arcing-over forms on the electrodes and a high-frequency current and a high-frequency voltage are measured.

16. The method according to claim 10, wherein a high frequency which changes over time is applied to the resonator and a high-frequency voltage and a high-frequency current are measured at several frequencies and the quality of the resonator is determined from a phase shift of the high-frequency voltage and the high-frequency current.

17. The method according to claim 10, wherein the impedance is determined in that a DC voltage is applied to the input of the resonator and with a DC voltage measurement of an ion current a resistance forming between the electrodes is measured.

18. A method for monitoring a combustion process in an internal combustion engine comprising the step of igniting a fuel-air mixture with a high-frequency plasma, comprising:

applying a high-frequency signal is applied to a resonator with a capacity which is so low that no electric arcing-over forms on the electrodes, measuring a high-frequency current and a high-frequency voltage, determining an impedance of the ignited mixture from the high-frequency current and the high-frequency voltage, determining both a temperature change and a pressure change based on the determined impedance, and evaluating the combustion process based on the determined temperature change and pressure change.

19. The method according to claim 18, evaluating the combustion process based on the determined whether or not firing-up has materialized based at least on the determined temperature change and pressure change.

* * * * *